United States Patent
Kawai

(10) Patent No.: US 11,171,596 B2
(45) Date of Patent: Nov. 9, 2021

(54) SHORT DETECTION APPARATUS WHICH DETECTS LAYER SHORT OF WINDING IN MOTOR, MOTOR CONTROL APPARATUS AND NUMERICAL CONTROL SYSTEM

(71) Applicant: Fanuc Corporation, Yamanashi (JP)

(72) Inventor: Yasuo Kawai, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 40 days.

(21) Appl. No.: 16/741,035

(22) Filed: Jan. 13, 2020

(65) Prior Publication Data

US 2020/0228045 A1 Jul. 16, 2020

(30) Foreign Application Priority Data

Jan. 16, 2019 (JP) .............................. JP2019-005281

(51) Int. Cl.
*H02P 29/024* (2016.01)
*G05B 19/18* (2006.01)

(52) U.S. Cl.
CPC ........ *H02P 29/0243* (2016.02); *G05B 19/188* (2013.01)

(58) Field of Classification Search
CPC .......................... H02P 29/0243; G05B 19/188
USPC ........................................ 318/434, 432, 433
See application file for complete search history.

(56) References Cited

U.S. PATENT DOCUMENTS

| | | | |
|---|---|---|---|
| 6,911,838 B2 * | 6/2005 | Rao ...................... | G01R 31/346 324/765.01 |
| 7,274,165 B2 * | 9/2007 | Takeuchi ............. | G05B 19/404 318/567 |
| 8,680,806 B2 * | 3/2014 | Mori ..................... | B23Q 17/22 318/632 |
| 8,781,765 B2 * | 7/2014 | Beatty .................. | G01R 31/346 702/59 |

FOREIGN PATENT DOCUMENTS

| | | |
|---|---|---|
| JP | S60-109742 A | 6/1985 |
| JP | 2012-220485 A | 11/2012 |
| JP | 2015029393 A | 2/2015 |

\* cited by examiner

*Primary Examiner* — David Luo
(74) *Attorney, Agent, or Firm* — RatnerPrestia

(57) ABSTRACT

A short detection apparatus configured to detect a layer short in a motor in which a plurality of sets of multi-phase windings are independently disposed in a stator includes an acquisition unit configured to acquire electricity information corresponding to windings of individual phases in the sets of the multi-phase windings; and a determination unit configured to determine, based on the electricity information which the acquisition unit acquires with respect to windings of a mutually identical phase in the sets of the multi-phase windings, whether a layer short occurs in any one of the windings of the mutually identical phase.

10 Claims, 11 Drawing Sheets

SHORT DETECTION APPARATUS WHICH DETECTS LAYER SHORT OF WINDING IN MOTOR, MOTOR CONTROL APPARATUS AND NUMERICAL CONTROL SYSTEM

CROSS-REFERENCE TO RELATED APPLICATIONS

This application is a new U.S. Patent Application that claims benefit of Japanese Patent Application No. 2019-005281, dated Jan. 16, 2019, the disclosure of this application is being incorporated herein by reference in its entirety for all purposes.

BACKGROUND OF THE INVENTION

1. Field of the Invention

The present invention relates to a short detection apparatus which detects a layer short of a winding in a motor, a motor control apparatus and a numerical control system.

2. Description of the Related Art

Conventionally, detection of a layer short of a winding in a motor is performed based on a comparison result between a current waveform of a motor that is a target of a test, and a current waveform measured in advance with respect to a normal motor with no layer short.

For example, as disclosed in Japanese Unexamined Patent Publication (Kokai) No. 60-109742, there is known a diagnosis method of a motor, in which current waveforms of respective phases during rotation of a three-phase motor are detected, and the presence/absence of a layer short or looseness of a winding of the motor is diagnosed based on the detection result. This method has a feature that a phase unbalance rate, which is correlated with a difference between a maximum phase difference and a minimum phase difference between the respective phases, is calculated from the detected current waveforms of the respective phases, and an amplitude unbalance rate, which is correlated with a maximum amplitude and a minimum amplitude of the current waveforms of the respective phases, is calculated, and, based on these, the presence/absence of a layer short or looseness of the winding of the motor is determined.

For example, as disclosed in Japanese Unexamined Patent Publication (Kokai) No. 2012-220485, there is known a good/faulty diagnosis system of electrical equipment (see, e.g. Patent Literature 2). The system includes characteristic amount detection means for detecting a characteristic amount from a current flowing in electric equipment that is a target of diagnosis; arithmetic storage means for deriving and storing a mean and a standard deviation of characteristic amounts acquired by the characteristic amount detection means when the electric equipment is in a normal state; and probability calculation means for calculating, when diagnosing the electric equipment, probability values existing within an elliptic body that is determined based on the characteristic amounts acquired by the characteristic amount detection means and the mean and standard deviation stored in the arithmetic storage means. The system includes diagnosis means for synchronously measuring currents flowing in plural phases of the electric equipment, deriving, by the probability calculation means, the probability value for each phase from the current flowing in each phase, and diagnosing whether the electric equipment is normal or abnormal, based on a probability value acquired by multiplying or adding the probability values acquired for the respective phases.

SUMMARY OF INVENTION

When a layer short in a winding in a motor is detected, there is a need to measure in advance the current waveform of a normal motor with no layer short. In addition, the current waveform which is used for detecting a layer short has to be measured by using a dedicated apparatus (hardware), and this is time-consuming. Further, the current waveform which is used for detecting a layer short has to be a current waveform which is measured when the motor is operating at a constant speed, and it is not possible to detect a layer short, based on the current waveform which is measured when the motor is accelerated or decelerated. Thus, the motor operation state, in which a layer short can be detected, is limited. This being the case, there is a demand for a technology which can detect a layer short of a winding in a motor in an arbitrary motor operation state, without using a dedicated apparatus.

According to one aspect of the present disclosure, a short detection apparatus configured to detect a layer short in a motor in which a plurality of sets of multi-phase windings are independently disposed in a stator includes an acquisition unit configured to acquire electricity information corresponding to windings of individual phases in the sets of the multi-phase windings; and a determination unit configured to determine, based on the electricity information which the acquisition unit acquires with respect to windings of a mutually identical phase in the sets of the multi-phase windings, whether a layer short occurs in any one of the windings of the mutually identical phase.

In addition, according to one aspect of the present disclosure, a motor control apparatus includes a motor control unit configured to control a motor, and the short detection apparatus.

In addition, according to one aspect of the present disclosure, a numerical control system of a machine tool includes the motor control apparatus.

BRIEF DESCRIPTION OF THE DRAWINGS

The present invention will be understood more clearly by referring to the following accompanying drawings.

DETAILED DESCRIPTION

Figure 1:
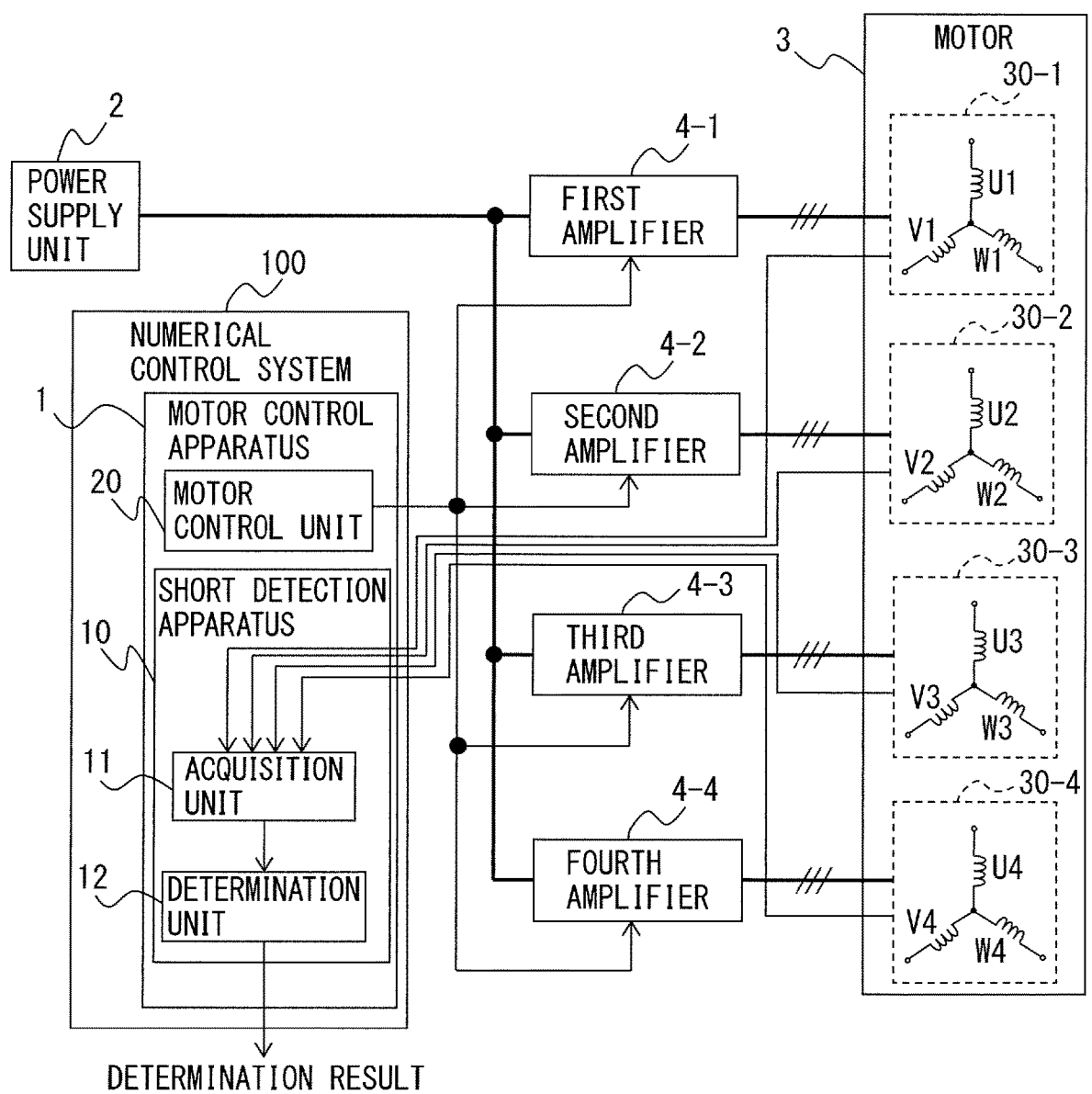
FIG. 1 is a view illustrating a short detection apparatus, a motor control apparatus and a numerical control system according to an embodiment of the present disclosure.

Hereinafter, referring to the accompanying drawings, a description will be given of a short detection apparatus which detects a layer short of a winding in a motor, a motor control apparatus and a numerical control system. In each drawing, similar members are denoted by like reference signs. For the purpose of easier understanding, reduction scales in the drawings are changed as appropriate. Embodiments illustrated in the drawings are merely examples for implementation, and the embodiments are not limited to those illustrated.

A short detection apparatus according to an embodiment of the present disclosure detects a layer short in a motor in which a plurality of sets of multi-phase windings are independently disposed in a stator. The motor, in which a plurality of sets of multi-phase windings are independently disposed in a stator, is called, for example, "motor including plural windings". Hereinafter, in the present specification, in accordance with the number of sets of multi-phase windings, a term "o-winding motor" is used (the number of sets of multi-phase windings is put in "o"). For example, a motor, in which the number of sets of multi-phase windings provided in the stator is four, is called "four-winding motor". By way of example, an embodiment is described in which a layer short of a four-winding motor, which is configured such that four sets of three-phase windings are independently disposed in the stator, is detected. However, the embodiment is also applicable to a multi-winding motor in which a plurality of sets of multi-phase windings, other than three-phase windings, are independently provided in the stator.

FIG. 1 is a view illustrating a short detection apparatus, a motor control apparatus and a numerical control system according to an embodiment of the present disclosure. Note that in FIG. 1 and FIG. 11 and FIG. 12 (to be described later), in order to simplify the drawings, a wiring line relating to a three-phase AC motor 3 is expressed by a combination of one wiring line "-" and three oblique lines "///" in accordance with customary practice.

A short detection apparatus 10 according to the embodiment of the present disclosure includes an acquisition unit 11 configured to acquire electricity information corresponding to windings of respective phases in each set of multi-phase windings of a motor 3; and a determination unit 12 configured to determine, based on the electricity information acquired by the acquisition unit 11 with respect to windings of a mutually identical phase in sets of multi-phase windings, whether a layer short occurs in any one of the windings of the identical phase. The electricity information acquired by the acquisition unit 11 includes, for example, waveforms of currents flowing in windings of individual phases of the multi-phase windings, waveforms of voltages occurring in windings of individual phases of the multi-phase windings, or amplitudes of instructions for respective sets for executing such control that the currents flowing in windings of individual phases in the multi-phase windings become equal.

In addition, a motor control apparatus 1 includes a motor control unit 20 and the short detection apparatus 10. The motor control apparatus 1 is provided, for example, in a numerical control system 100 of a machine tool.

In the example illustrated in FIG. 1, the motor 3 is a four-winding motor including four sets (i.e. 30-1, 30-2, 30-3, 30-4) of independent three-phase windings.

Figure 2:
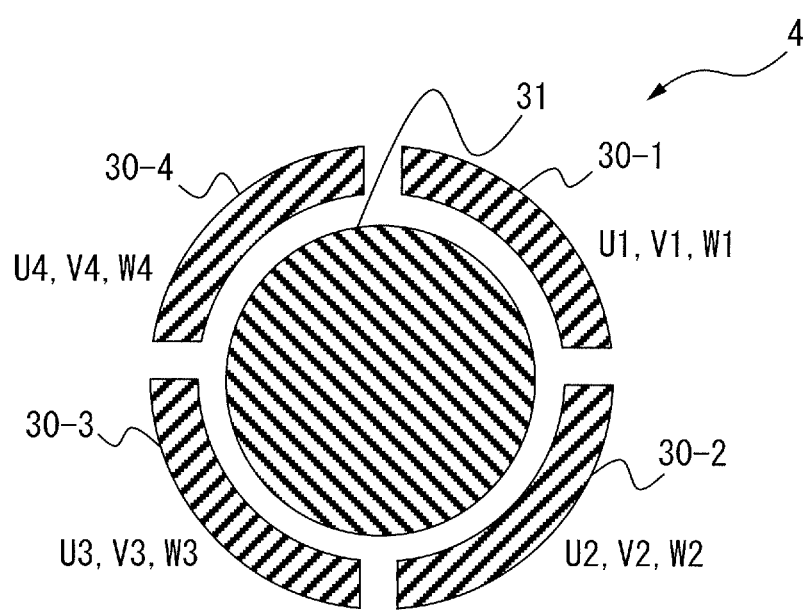
FIG. 2 is a schematic view illustrating an example of a four-winding motor including four sets of independent three-phase windings.
Figure 3:
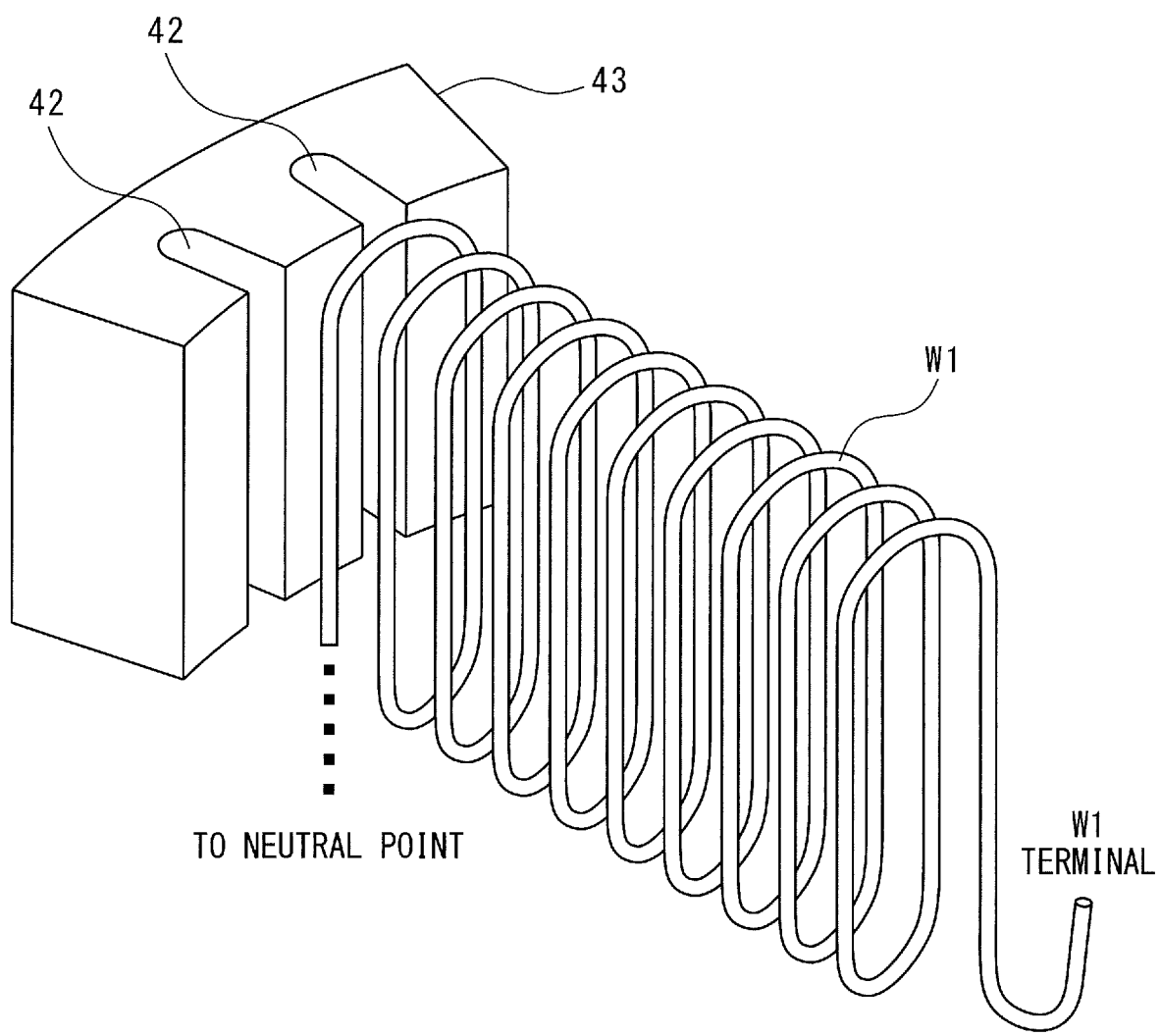
FIG. 3 is an exploded perspective view for explaining a positional relationship between a winding and slots in a stator.
Figure 4:
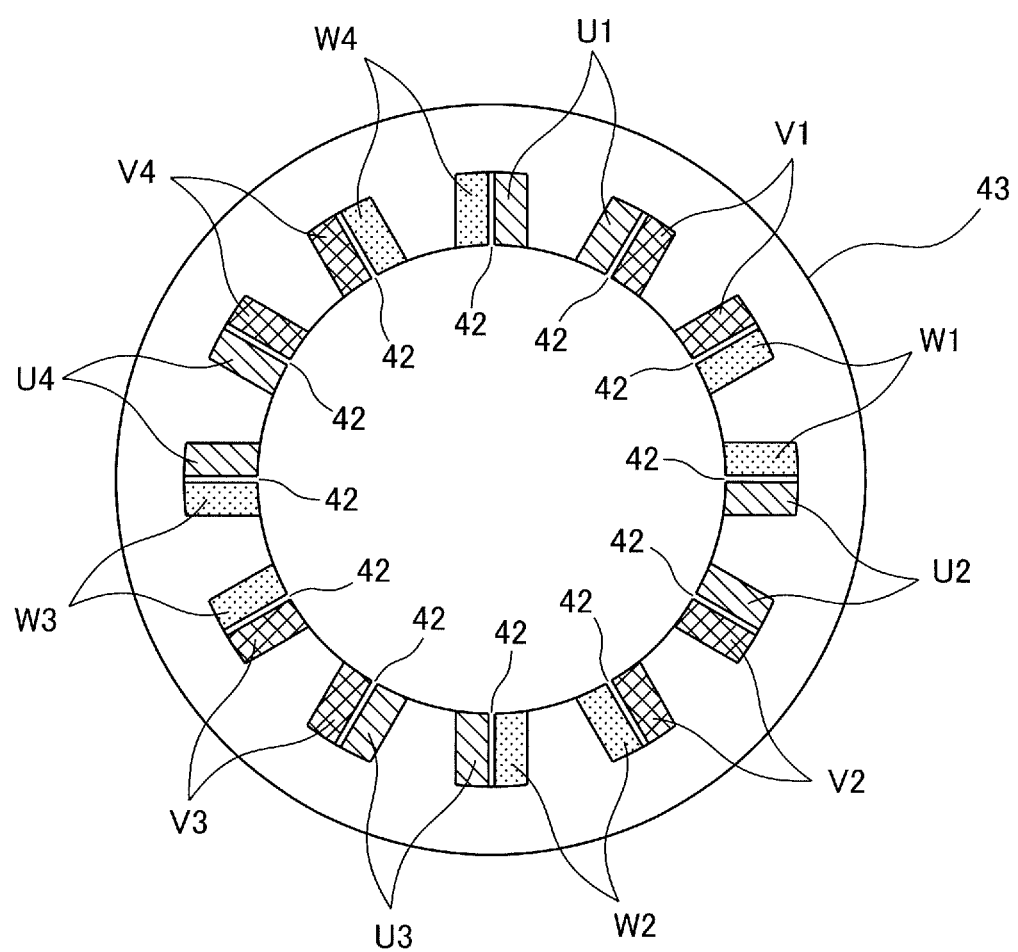
FIG. 4 is a cross-sectional view illustrating an example of an arrangement of respective three-phase windings of the four-winding motor in the stator.

An example of the four-winding motor will now be described. FIG. 2 is a schematic view illustrating an example of the four-winding motor including four sets of independent three-phase windings. FIG. 3 is an exploded perspective view for explaining a positional relationship between a winding and slots in a stator. FIG. 4 is a cross-sectional view illustrating an example of an arrangement of respective three-phase windings of the four-winding motor in the stator. As illustrated in FIG. 2, for example, around a rotor 31 of the four-winding motor 3, four sets (i.e. 30-1, 30-2, 30-3, 30-4) of independent three-phase windings are arranged in the stator. It is assumed that a U-phase winding in the three-phase windings of the set 30-1 is U1, and a V-phase winding is V1, and a W-phase winding is W1. It is also assumed that a U-phase winding in the three-phase windings of the set 30-2 is U2, and a V-phase winding is V2, and a W-phase winding is W2. It is assumed that a U-phase winding in the three-phase windings of the set 30-3 is U3, and a V-phase winding is V3, and a W-phase winding is W3. It is assumed that a U-phase winding in the three-phase windings of the set 30-4 is U4, and a V-phase winding is V4, and a W-phase winding is W4. Accordingly, in the four-winding motor, the U-phase windings are U1, U2, U3 and U4, the V-phase windings are V1, V2, V3 and V4, and the W-phase windings are W1, W2, W3 and W4. As illustrated in FIG. 3, for example, the W-phase winding W1 of the set 30-1 of three-phase windings is disposed in slots 42 in a stator 43. In addition, as illustrated in FIG. 4, the respective windings of the four sets (i.e. 30-1, 30-2, 30-3, 30-4) of independent three-phase windings are disposed in the slots 42 in the stator 43.

As illustrated in FIG. 1, in order to drive the multi-winding motor, amplifiers for supplying driving electric power to the respective windings are provided in association with the respective sets (i.e. 30-1, 30-2, 30-3, 30-4) of three-phase windings. Specifically, a first amplifier 4-1 is connected to the set 30-1 of three-phase windings, and a second amplifier 4-2 is connected to the set 30-2 of three-phase windings. A third amplifier 4-3 is connected to the set 30-3 of three-phase windings, and a fourth amplifier 4-4 is connected to the set 30-4 of three-phase windings.

In order to drive the motor 3, the first amplifier 4-1, second amplifier 4-2, third amplifier 4-3 and fourth amplifier 4-4 convert DC power, which is supplied from a power supply unit 2, to AC power having a desired voltage and a desired frequency, and supply the AC power to the respective sets (i.e. 30-1, 30-2, 30-3, 30-4) of three-phase windings in the motor 3. Thus, each of the first amplifier 4-1, second amplifier 4-2, third amplifier 4-3 and fourth amplifier 4-4 includes, for example, an inverter. In the inverter in each of the first amplifier 4-1, second amplifier 4-2, third amplifier 4-3 and fourth amplifier 4-4, each switching element is ON/OFF controlled based on a driving instruction which is received from the motor control unit 20 in the motor control apparatus 1, and thereby the inverter converts DC power, which is supplied from the power supply unit 2, to AC power for driving the motor 3, and outputs the AC power. Thus, the motor 3 operates, based on the AC power which is, for example, voltage-variable and frequency-variable. The inverter is composed of, for example, a bridge circuit including a switching element and a diode which is connected to the switching element in an inverse parallel fashion. For example, based on PWM switching control of a triangular-wave comparison method, each switching element is ON/OFF controlled. Examples of the switching element include a unipolar transistor such as an FET, a bipolar transistor, an IGBT, a thyristor, and a GTO. The kind itself of the switching element does not restrict the present embodiment, and other switching elements may be employed.

The power supply unit 2 is composed of, for example, a rectifier which converts AC power, which is supplied from an AC power supply (not illustrated), to DC power, and outputs the DC power. For example, the power supply unit 2 may be a battery.

The short detection apparatus 10 and motor control unit 20 may be constructed, for example, in a software program form, or may be constructed by a combination of various electronic circuits and a software program. For example, when the short detection apparatus 10 and motor control unit 20 are constructed in the software program form, an arithmetic processing device, such as a DSP or FPGA, in the motor control apparatus 1 is operated according to the software program, thus being able to realize the functions of the short detection apparatus 10 and motor control unit 20. The motor control apparatus 1 including the short detection apparatus 10 and motor control unit 20 may be provided, for example, in the numerical control system 100 of a machine tool. Further, the short detection apparatus 10 constructed in the software program form may be provided on the outside of the motor control apparatus 1 and in the inside of the numerical control system 100. In this case, an arithmetic processing device, such as a DSP or FPGA, in the numerical control system 100 is operated according to the software program, thus being able to realize the function of the short detection apparatus 10. The software program which realize the function of the short detection apparatus 10 may be stored in a storage medium.

In this manner, the short detection apparatus 10 constructed in the software program form is realized by the operation of the arithmetic processing apparatus such as the DSP or FPGA in the motor control apparatus 1 according to the software program, or by the operation of the arithmetic processing apparatus such as the DSP or FPGA in the numerical control system 100 according to the software program. Therefore, unlike conventional art, there is no need to use a dedicated apparatus for detecting a layer short.

Figure 6:
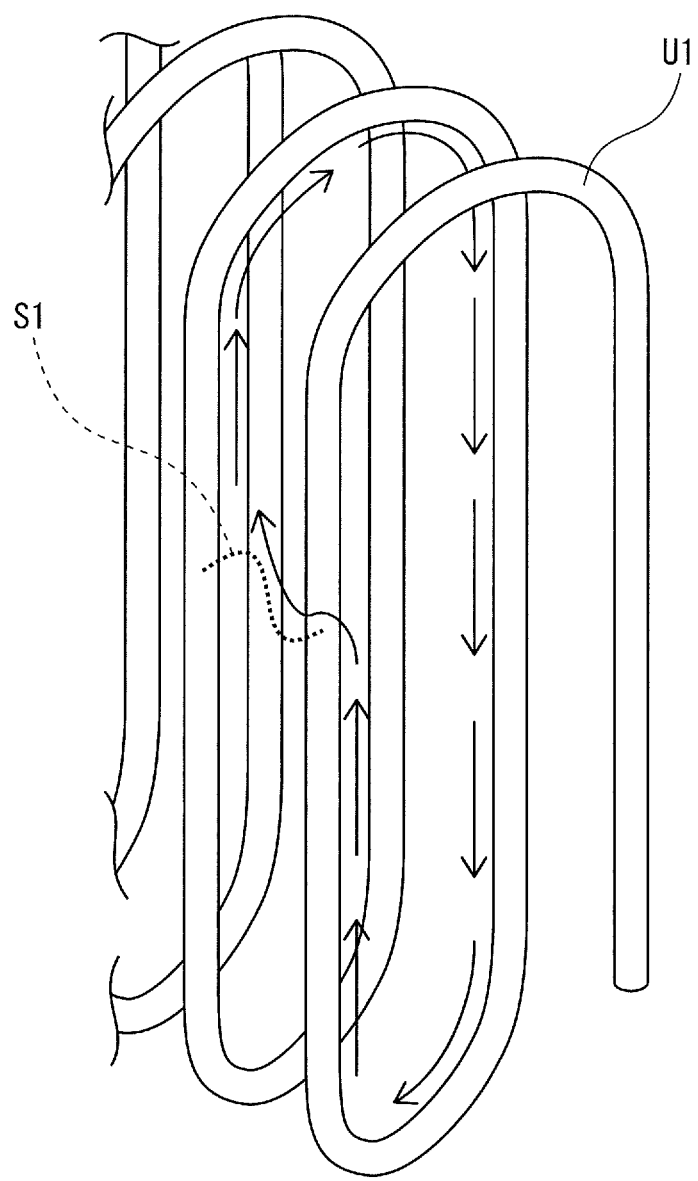
FIG. 6 is a view for explaining a path of current flowing due to a layer short which occurs in a winding of a multi-winding motor.
Figure 7:
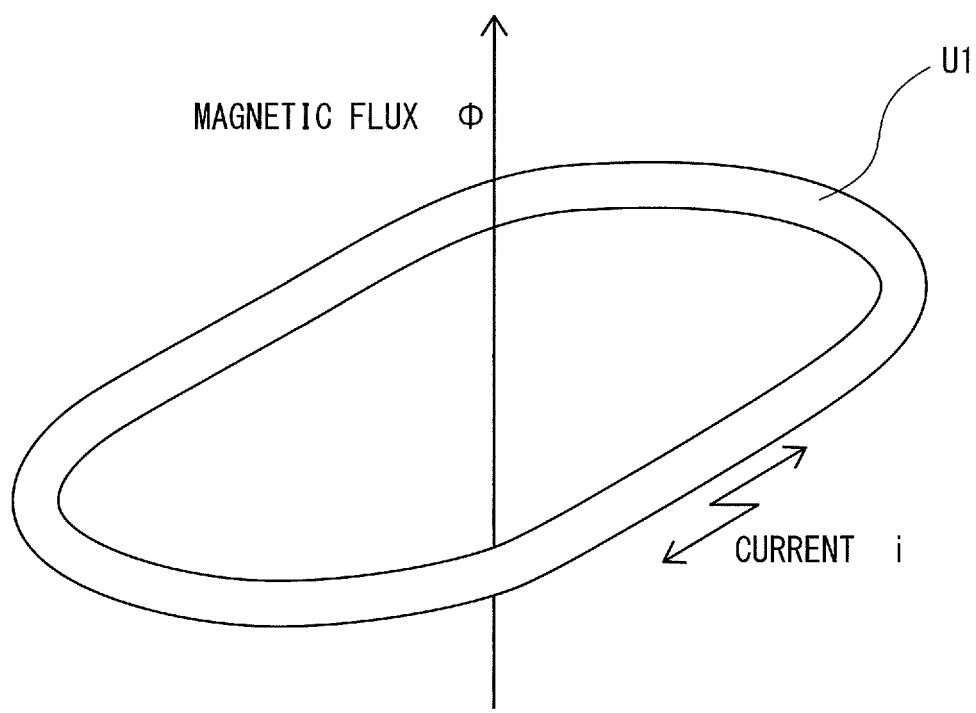
FIG. 7 is a view for explaining a relationship between a circulating current occurring due to a layer short and a magnetic flux.

Next, referring to FIG. 5 to FIG. 7, an operational principle of the short detection apparatus 10 according to the embodiment of the present disclosure will be described.

Figure 5:
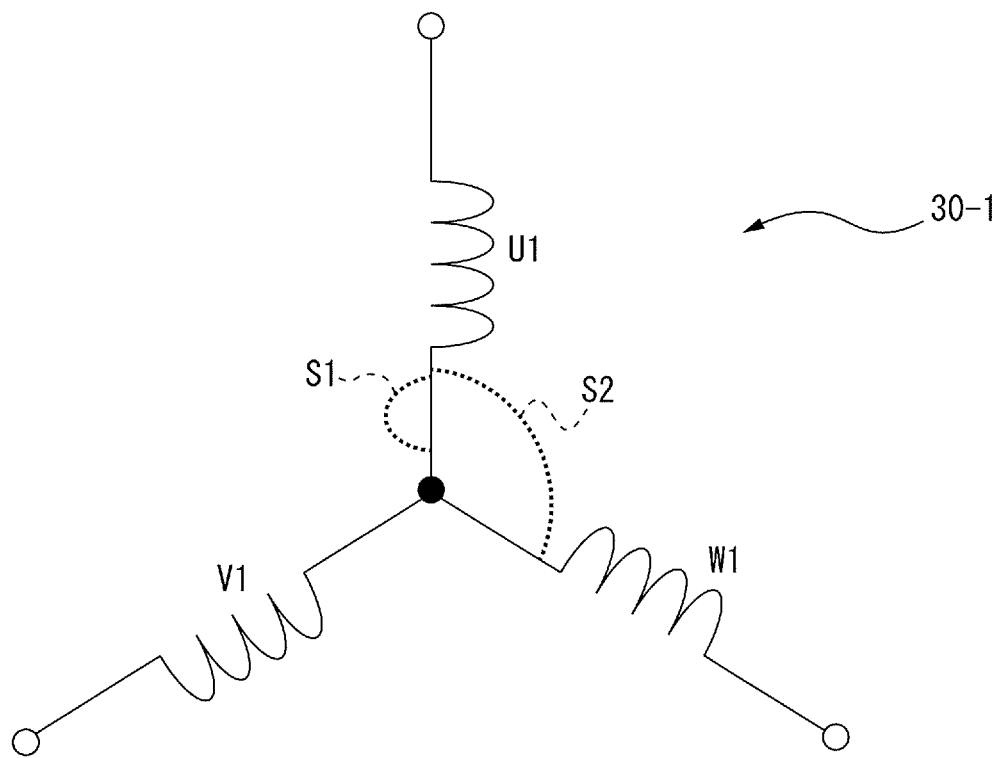
FIG. 5 is a view for explaining a layer short which occurs in a winding of a multi-winding motor.

FIG. 5 is a view for explaining a layer short which occurs in a winding of a multi-winding motor. FIG. 6 is a view for explaining a path of current flowing due to a layer short which occurs in a winding of a multi-winding motor. FIG. 7 is a view for explaining a relationship between a circulating current occurring due to a layer short and a magnetic flux. In the multi-winding motor, a winding (coil) is overlappingly wound multiple times and disposed in the stator. Layers of the winding are in an overlapping state, and the layers of the winding are mutually insulated. For example, when insulation between the layers is broken by vibration due to the rotation of the motor, the layers of the winding are shorted. For example, as illustrated in FIG. 5, in one set (30-1) of three-phase windings, when a layer short occurs at a position S1 in the U-phase winding U1, a loop-shaped current path including the position S1 is formed on the winding U1, as indicated by an arrow in FIG. 6. As illustrated in FIG. 7, when the motor 3 is rotating, a magnetic flux Φ, which penetrates the loop-shaped current path including the position S1, varies every moment, and an electromotive voltage e as expressed by equation 1 is generated.

[Equation 1]

$$e = -\frac{d\Phi}{dt} \quad (1)$$

By the occurrence of a layer short on the wiring U1, a resistance component and inductance component of the winding U1 vary. When the impedance of the loop-shaped current path formed on the winding U1 is Z, a circulating current i as expressed by equation 2 flows in the current path.

[Equation 2]

$$i = \frac{e}{Z} = -\frac{1}{Z} \cdot \frac{d\Phi}{dt} \quad (2)$$

In this manner, due to the circulating current i flowing in the loop-shaped current path including the position S1 where the layer short occurs, if the waveforms of currents flowing in the windings of the mutually identical phase in the plural sets of multi-phase windings are mutually compared between the sets, the waveform of current flowing in the winding of the set in which the layer short occurs becomes different from the waveform of current flowing in the winding of the normal set in which no layer short occurs. In addition, the waveform of current flowing in the winding corresponds to the waveform of voltage occurring in the winding. Thus, if the waveforms of voltages occurring in the windings of the identical phase in the plural sets of multi-phase windings are mutually compared between the sets, the waveform of voltage occurring in the winding of the set in which the layer short occurs becomes different from the waveform of voltage occurring in the winding of the normal set in which no layer short occurs. In a multi-winding motor in which an identical voltage is applied to the respective multi-phase windings of the plural sets by an identical instruction, when no layer short occurs in the windings of each set of multi-phase windings, the waveforms of current and voltage become substantially identical with respect to the windings of the identical phase in all sets. However, when a layer short occurs in one phase of a certain set of multi-phase windings, the waveforms of current and voltage with respect to the winding in which the layer short occurs in the set become different from the waveforms of current and voltage with respect to the windings of the identical phase in the other sets. Taking this into account, in the embodiment of the present disclosure, the acquisition unit 11 acquires electricity information corresponding to windings of respective phases in each set of multi-phase windings, and the determination unit 12 determines, based on the electricity information acquired by the acquisition unit 11 with respect to windings of the identical phase in sets of multi-phase windings, whether a layer short occurs in any one of the windings of the identical phase. The electricity information acquired by the acquisition unit 11 includes, for example, waveforms of currents flowing in windings of individual phases of the multi-phase windings, waveforms of voltages occurring in windings of individual phases of the multi-phase windings, or amplitudes of instructions for respective sets for executing such control that the currents flowing in windings of individual phases in the multi-phase windings become equal. When the electricity information is the waveform of current, the acquisition unit 11 acquires the waveform of current detected by a current detection unit (not illustrated). When the electricity information is the waveform of voltage, the acquisition unit 11 acquires the waveform of voltage detected by a voltage detection unit (not illustrated). When the electricity information is the instruction, the acquisition unit 11 acquires an instruction from the motor control unit 20.

Next, some examples of embodiments of a layer short detection process by the short detection apparatus 10 will successively be described.

Figure 8:
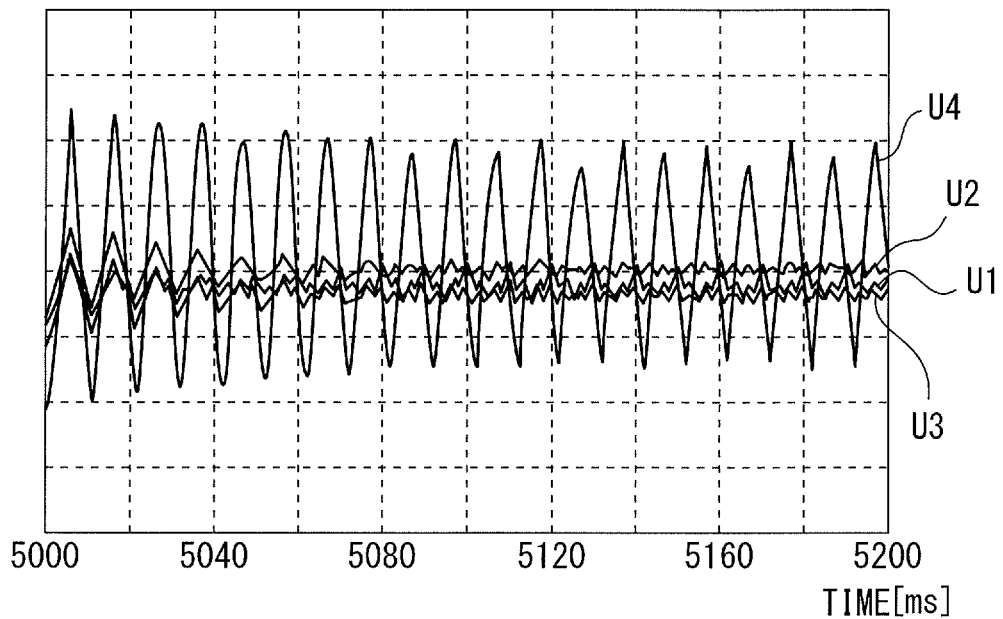
FIG. 8 is a view illustrating an example of waveforms of currents when a layer short occurs in a U-phase winding of one of plural sets of three-phase windings in a first embodiment.

In a first embodiment, in a multi-winding motor in which an identical voltage is applied to a plurality of sets of multi-phase windings by control based on an identical instruction, waveforms of currents flowing in windings of individual phases in each set of multi-phase windings, or waveforms of voltages occurring in the windings of the individual phases in each set of multi-phase windings, are acquired as electricity information corresponding to the respective windings in the multi-phase windings, and, based on amplitudes of the waveforms acquired with respect to the windings of the identical phase in the sets of multi-phase windings, it is determined whether a layer short occurs in a winding of the phase. FIG. 8 is a view illustrating an example of waveforms of currents when a layer short occurs in a U-phase winding of one of plural sets of three-phase windings in the first embodiment. The acquisition unit 11 acquires waveforms of currents flowing in windings of individual phases in each set of three-phase windings, or waveforms of voltages occurring in the windings of the individual phases in each set of three-phase windings, as electricity information corresponding to the respective windings in the three-phase windings of the motor 3 in which an identical voltage is applied to the sets of multi-phase windings by control based on an identical instruction. In the example illustrated in FIG. 8, waveforms of currents flowing in the windings of the individual phases in the three-phase windings are acquired. The determination unit 12 compares, between the sets, the waveforms acquired by the acquisition unit 11 with respect to the windings of the mutually identical phase. When a difference between the amplitude of the waveform in any one of the sets of three-phase windings and the amplitudes of the waveforms in the other sets of three-phase windings is greater than a preset amplitude threshold, the determination unit 12 determines that a layer short occurs in the identical phase of the one set of three-phase windings. In the example illustrated in FIG. 8, since a layer short occurs in the U-phase winding U4 in the set 30-4 among the sets of three-phase windings, the amplitude of the waveform of current with respect to the U-phase winding U4 in the set 30-4 becomes different from the amplitudes of the waveforms of currents with respect to the U-phase winding U1 in the set 30-1, the U-phase winding U2 in the set 30-2 and the U-phase winding U3 in the set 30-3. For example, when a difference between the amplitude of the waveform of current with respect to the U-phase winding U4 in the set 30-4 and the amplitude of the waveform of each current with respect to the U-phase winding U1 in the set 30-1, the U-phase winding U2 in the set 30-2 and the U-phase winding U3 in the set 30-3 is greater than a preset amplitude threshold, the determination unit 12 determines that a layer short occurs in the U-phase winding U4 in the set 30-4. Note that the amplitude threshold, which is used when determining the presence/absence of occurrence of a layer short by the determination unit 12, may be set at a value sufficiently greater than a noise level, in order to prevent erroneous detection due to noise that is present on the waveform.

Figure 9:
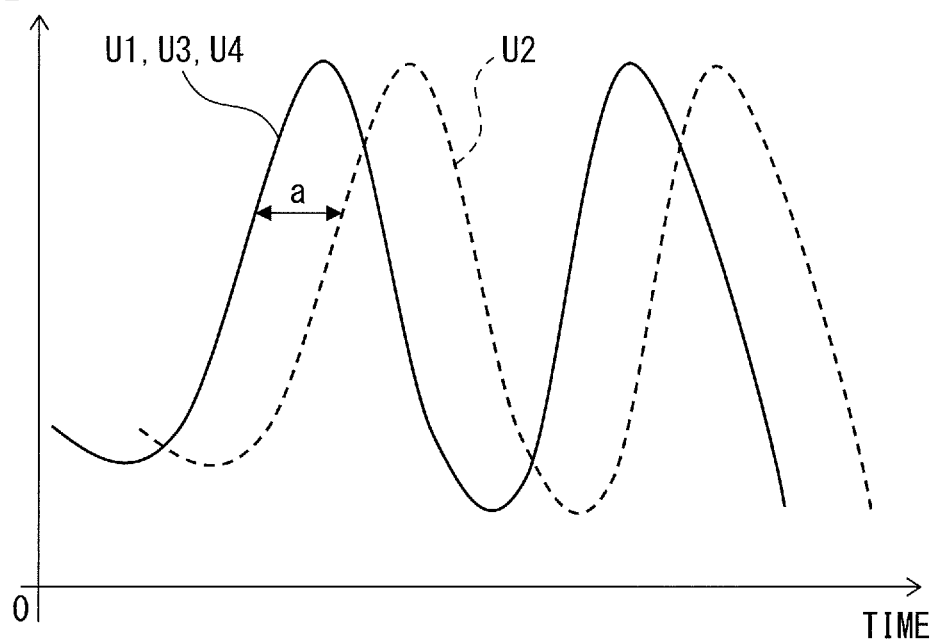
FIG. 9 is a view illustrating an example of waveforms of currents when a layer short occurs in a U-phase winding of one of plural sets of three-phase windings in a second embodiment.

In a second embodiment, in a multi-winding motor in which an identical voltage is applied to a plurality of sets of multi-phase windings by control based on an identical instruction, waveforms of currents flowing in windings of individual phases in each set of multi-phase windings, or waveforms of voltages occurring in the windings of the individual phases in each set of multi-phase windings, are acquired as electricity information corresponding to the respective windings in the multi-phase windings, and, based on phases of the waveforms acquired with respect to the windings of the identical phase in the sets of multi-phase windings, it is determined whether a layer short occurs in a winding of the phase. FIG. 9 is a view illustrating an example of waveforms of currents when a layer short occurs in a U-phase winding of one of plural sets of three-phase windings in the second embodiment. The acquisition unit 11 acquires waveforms of currents flowing in windings of individual phases in each set of three-phase windings, or waveforms of voltages occurring in the windings of the individual phases in each set of three-phase windings, as electricity information corresponding to the respective windings in the three-phase windings of the motor 3 in which an identical voltage is applied to the sets of multi-phase windings by control based on an identical instruction. In the example illustrated in FIG. 9, waveforms of currents flowing in the windings in the three-phase windings are acquired. The determination unit 12 compares, between the sets, the waveforms acquired by the acquisition unit 11 with respect to the windings of the mutually identical phase. When a difference between the phase of the waveform in any one of the sets of three-phase windings and the phases of the waveforms in the other sets of three-phase windings is greater than a preset phase threshold, the determination unit 12 determines that a layer short occurs in the identical phase of the one set of three-phase windings. In the example illustrated in FIG. 9, it is assumed that a layer short occurs in the U-phase winding U2 in the set 30-2 among the sets of three-phase windings. In this case, since inductance lowers in the U-phase winding U2 in the set 30-2, the phase of the waveform of current with respect to the U-phase winding U2 shifts ahead of the phase of the waveform of each current with respect to the U-phase winding U1 in the set 30-1, the U-phase winding U3 in the set 30-3 and the U-phase winding U4 in the set 30-4. For example, when a difference (indicated by a in FIG. 9) between the phase of the waveform of current with respect to the U-phase winding U2 in the set 30-2 and the phase of the waveform of each current with respect to the U-phase winding U1 in the set 30-1, the U-phase winding U3 in the set 30-3 and the U-phase winding U4 in the set 30-4 is greater than a preset phase threshold, the determination unit 12 determines that a layer short occurs in the U-phase winding U2 in the set 30-2. Note that the phase threshold, which is used when determining the presence/absence of occurrence of a layer short by the determination unit 12, may be set at a value sufficiently greater than a noise level, in order to prevent erroneous detection due to noise that is present on the waveform.

Figure 10:
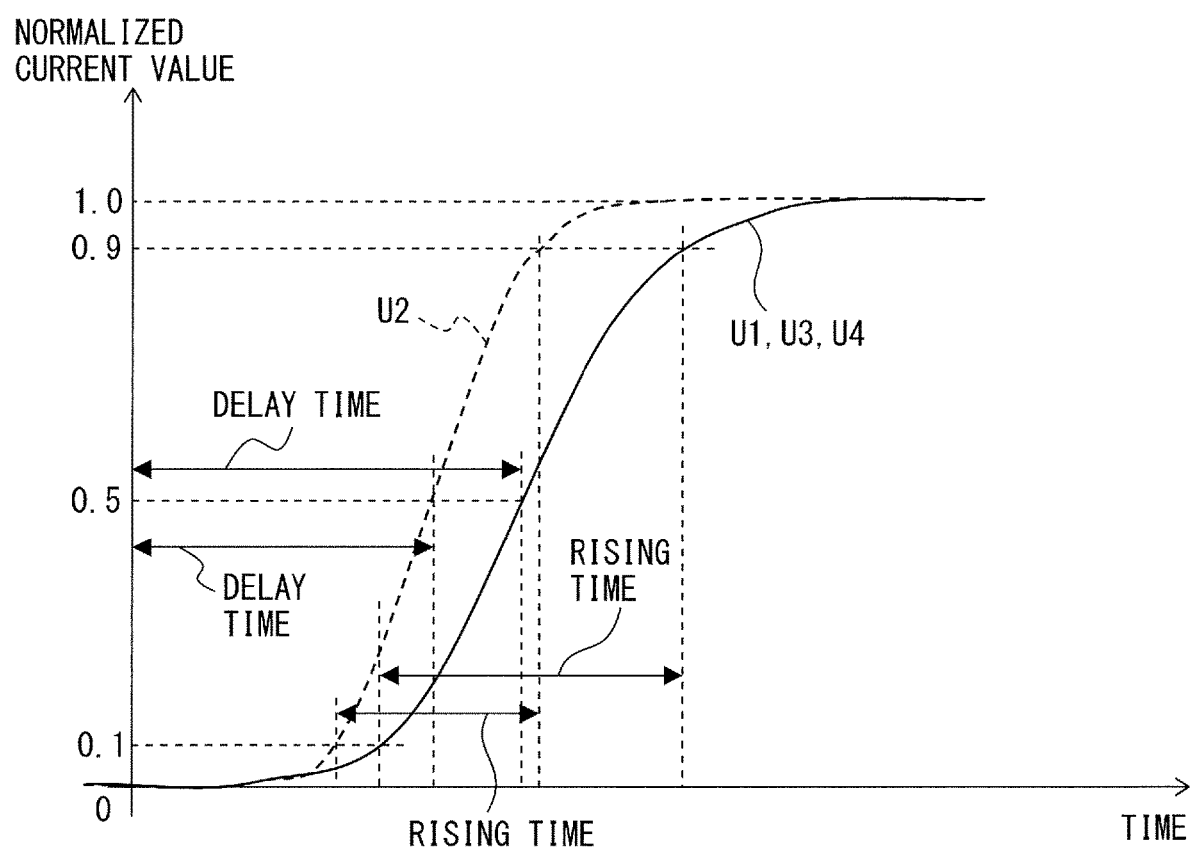
FIG. 10 is a view illustrating an example of waveforms of currents when a layer short occurs in a U-phase winding of one of plural sets of three-phase windings in a third embodiment.

In a third embodiment, the short detection apparatus 10 executes a layer short detection process when a multi-winding motor, in which an identical voltage is applied to a plurality of sets of multi-phase windings by control based on an identical instruction, is accelerated from a stop state. In the third embodiment, in a multi-winding motor in which an identical voltage is applied to a plurality of sets of multi-phase windings by control based on an identical instruction, waveforms of currents flowing in windings of individual phases in each set of multi-phase windings at a time when the multi-winding motor is accelerated from the stop state, or waveforms of voltages occurring in the windings of the individual phases in each set of multi-phase windings at a time when the multi-winding motor is accelerated from the stop state, are acquired as electricity information corresponding to the respective windings in the multi-phase windings, and, based on rising times of the waveforms acquired with respect to the windings of the identical phase in the sets of multi-phase windings, it is determined whether a layer short occurs in a winding of the phase. FIG. 10 is a view illustrating an example of waveforms of currents when a layer short occurs in the U-phase winding of one of plural sets of three-phase windings in the third embodiment. In FIG. 10, the ordinate axis indicates a current value normalized by the amplitude of current at a time when the acceleration of the motor 3 is completed and the motor 3 rotates at a constant speed. Specifically, the current value at a time when the acceleration of the motor 3 is completed and the motor 3 rotates at a constant speed is set at 1.0 (i.e. 100%). The "rising time" of the waveform of current is defined as a time needed until the normalized current value reaches 0.9 (i.e. 90%) from 0.1 (i.e. 10%). The acquisition unit 11 acquires, as electricity information corresponding to the respective windings of the three-phase windings of the motor 3 in which an identical voltage is applied to the plural sets of multi-phase windings by control based on an identical instruction, waveforms of currents flowing in the windings of individual phases in the respective sets of multi-phase windings, or waveforms of voltages occurring in the windings of the individual phases in the respective sets of multi-phase windings, at a time when the multi-winding motor is accelerated from the stop state. In the example illustrated in FIG. 10, the acquisition unit 11 acquires waveforms of currents flowing in the respective windings in the three-phase windings. For example, the determination unit 12 compares, between the sets, rising times of the waveforms acquired by the acquisition unit 11 with respect to the windings of the mutually identical phase at a time when the motor 3 is accelerated from the stop state. When a difference between the rising time of the waveform of any one of the sets and the rising times of the waveforms of the other sets is greater than a preset rising time threshold, the determination unit 12 determines that a layer short occurs in the identical phase of the one set of three-phase windings. In the example illustrated in FIG. 10, it is assumed that a layer short occurs in the U-phase winding U2 in the set 30-2 among the sets of three-phase windings. In this case, since inductance lowers in the U-phase winding U2 in the set 30-2, the rising time of the waveform of current with respect to the U-phase winding U2 becomes shorter from the rising time of the waveform of each current with respect to the U-phase winding U1 in the set 30-1, the U-phase winding U3 in the set 30-3 and the U-phase winding U4 in the set 30-4. For example, when a difference between the rising time of the waveform of current with respect to the U-phase winding U2 in the set 30-2 and the rising time of the waveform of each current with respect to the U-phase winding U1 in the set 30-1, the U-phase winding U3 in the set 30-3 and the U-phase winding U4 in the set 30-4 is greater than a preset rising time threshold, the determination unit 12 determines that a layer short occurs in the U-phase winding U2 in the set 30-2. Note that the rising time threshold, which is used when determining the presence/absence of occurrence of a layer short by the determination unit 12, may be set at a value sufficiently greater than a noise level, in order to prevent erroneous detection due to noise that is present on the waveform. In the third embodiment, the presence/absence of occurrence of a layer short is determined based on the rising time of the waveform of current. In one modification, the presence/absence of occurrence of a layer short may be determined based on a delay time of the waveform of current. The "delay time" of the waveform of current is defined as a time needed until the normalized current value reaches 0.5 (i.e. 50%) from the start of acceleration of the motor 3. According to the present modification, the determination unit 12 compares, between the sets, delay times of the waveforms acquired by the acquisition unit 11 with respect to the windings of the mutually identical phase at a time when the motor 3 is accelerated from the stop state. When a difference between the delay time of the waveform of any one of the sets and the delay times of the waveforms of the other sets is greater than a preset delay time threshold, the determination unit 12 determines that a layer short occurs in the identical phase of the one set of three-phase windings. Note that the delay time threshold, which is used when determining the presence/absence of occurrence of a layer short by the determination unit 12, may be set at a value sufficiently greater than a noise level, in order to prevent erroneous detection due to noise that is present on the waveform.

The layer short detection processes by the short detection apparatus 10 according to the above-described first to third embodiments may be executed singly or may be executed in combination. For example, when two or three of the first to third embodiments are executed in combination, the precision of the layer short detection becomes higher than when each of the first to third embodiments is executed singly.

Figure 11:
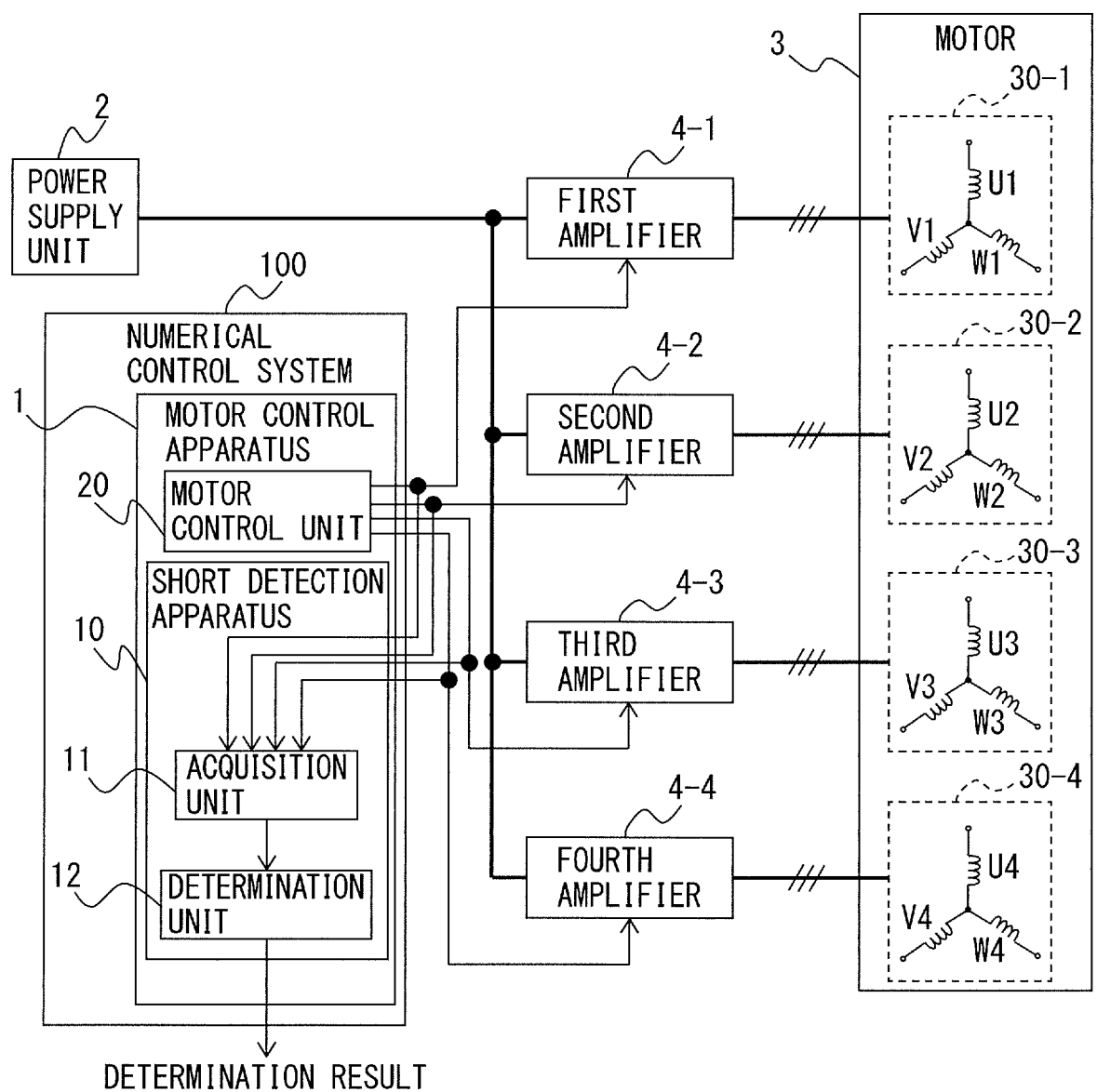
FIG. 11 is a view illustrating a short detection apparatus, a motor control apparatus and a numerical control system, in which a short detection process according to a fourth embodiment is executed.

In a fourth embodiment, in a multi-winding motor in which individual control is executed by instructions for respective sets such that currents flowing in windings of individual phases in multi-phase windings become identical, amplitudes of instructions corresponding to the respective windings in the multi-phase windings are acquired from the motor control unit 20 as electricity information corresponding to the respective windings in the multi-phase windings, and, based on amplitudes of instructions which correspond to the windings of the identical phase and are acquired with respect to the respective sets, it is determined whether a layer short occurs in a winding of the phase. The instruction used in the layer short determination may be any one of a current instruction, a torque instruction and a speed instruction. FIG. 11 is a view illustrating a short detection apparatus, a motor control apparatus and a numerical control system, in which a short detection process according to the fourth embodiment is executed. The motor control unit 20 executes individual control by instructions for the respective sets such that the currents flowing in the respective windings in the three-phase windings of the motor 3 become identical. Specifically, the motor control unit 20 individually generates and outputs instructions to the first amplifier 4-1, second amplifier 4-2, third amplifier 4-3 and fourth amplifier 4-4 which supply driving electric power to the respective sets of three-phase windings of the motor 3, in such a manner that the currents flowing in the windings in the three-phase windings of the motor 3 become identical with respect to the identical phase. When the motor control unit 20 generates the instructions, the currents flowing in the respective windings of each set of three-phase windings are fed back to the motor control unit 20. As described above, the waveform of current flowing in the winding of a phase in which a layer short occurs in a certain set of three-phase windings becomes different from the waveform of current flowing in the normal windings of the identical phase in which no layer short occurs in the other sets. When no layer short occurs in any one of the windings of all sets of multi-phase windings, the amplitudes of instructions for the windings of the identical phase become substantially identical in all sets. However, when a layer short occurs in one phase of a certain set of multi-phase windings, the waveform of current flowing in the winding of the phase in this set in which the layer short occurs becomes different from the waveforms of currents with respect to the windings of the identical phase in the other sets. At this time, the motor control unit 20 generates an instruction corresponding to the winding of the phase in which the layer short occurs, in such a manner that the current flowing in the winding of the phase in which the layer short occurs becomes identical to the currents flowing in the normal windings of the identical phase in the other sets in which no layer short occurs. Thus, the instruction corresponding to the winding of the phase in which the layer short occurs becomes different from the instructions corresponding to the windings of the identical phase in the other sets. Taking this into account, in the fourth embodiment, based on the amplitudes of the instructions corresponding to the windings of the identical phase acquired for the respective sets, it is determined whether a layer short occurs in a winding of this phase. To be more specific, the acquisition unit 11 acquires from the motor control unit 20 the amplitudes of the instructions for the respective sets for executing such control that the currents flowing in the windings of individual phases in the multi-phase windings become identical, as the electricity information corresponding to the respective windings in the three-phase windings of the motor 3 in which individual control is executed by instructions for the respective sets such that currents flowing in the windings in the multi-phase windings become identical. The determination unit 12 compares, between the sets, the amplitudes of the instructions acquired by the acquisition unit 11 with respect to the windings of the mutually identical phase. When a difference between the amplitude of the instruction in any one of the sets and the amplitudes of the instructions in the other sets is greater than a preset instruction threshold, the determination unit 12 determines that a layer short occurs in the identical phase of the one set of multi-phase windings. Note that the instruction threshold, which is used when determining the presence/absence of occurrence of a layer short by the determination unit 12, may be set at a value sufficiently greater than a noise level, in order to prevent erroneous detection due to noise included in the current that is fed back from each winding.

Figure 12:
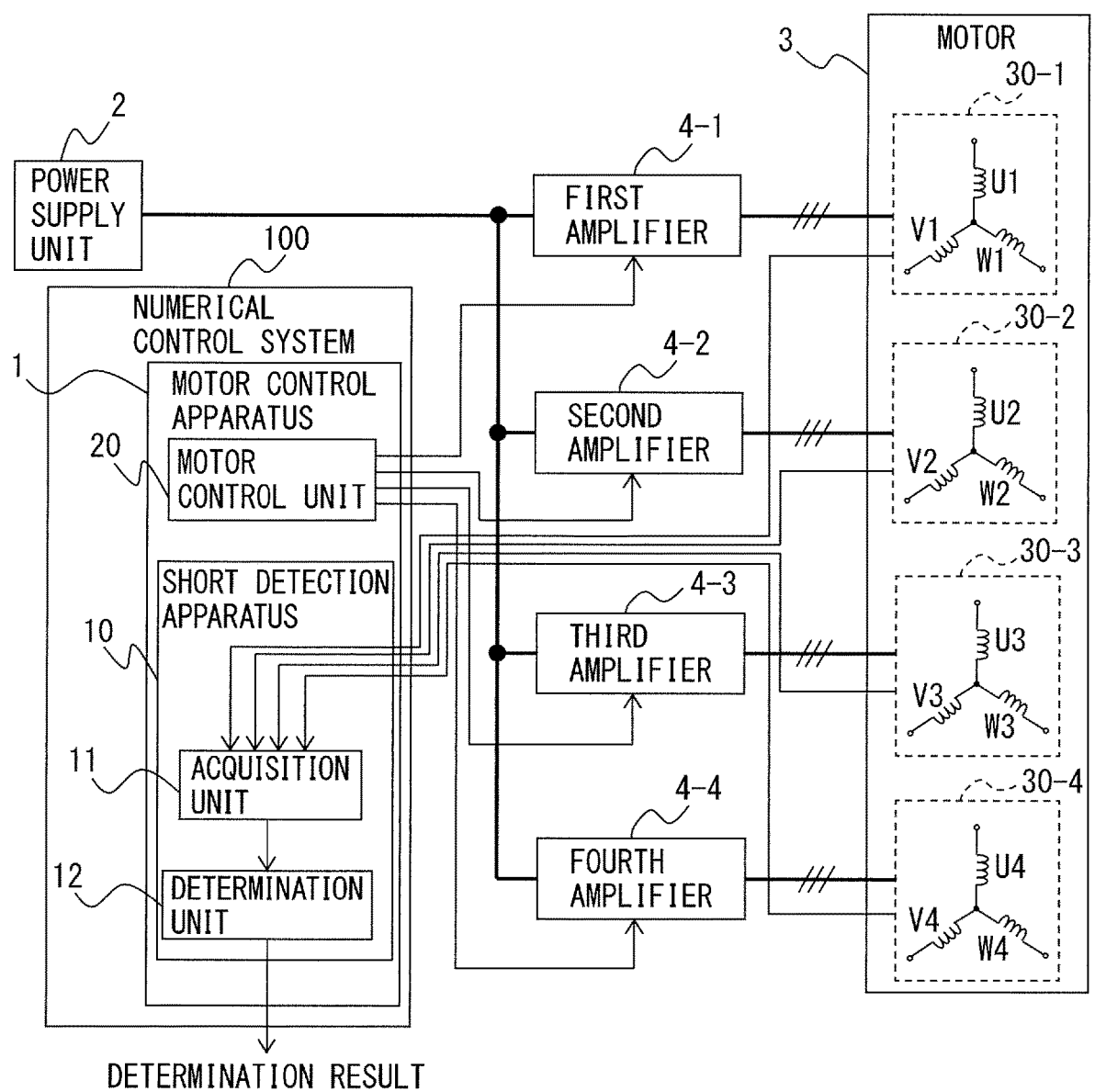
FIG. 12 is a view illustrating a short detection apparatus, a motor control apparatus and a numerical control system, in which short detection processes according to the first to third embodiments are executed for a multi-winding motor in which currents flowing in the respective windings in multi-phase windings are individually controlled by an instruction for each set such that the currents become equal.

Like the first to third embodiments, also in a multi-winding motor in which individual control is executed by instructions for respective sets such that currents flowing in windings in multi-phase windings become identical, waveforms of currents flowing in windings of individual phases in each set of multi-phase windings, or waveforms of voltages occurring in the windings of the individual phases in each set of multi-phase windings, may be acquired as electricity information corresponding to the respective windings in the multi-phase windings, and, based on amplitudes, phases or rising times (delay times) of the waveforms acquired with respect to the windings of the identical phase in the sets of multi-phase windings, it may be determined whether a layer short occurs in a winding of the phase. FIG. 12 is a view illustrating a short detection apparatus, a motor control apparatus and a numerical control system, in which the short detection processes according to the first to third embodiments are executed for the multi-winding motor in which individual control is executed by instructions for the respective sets such that the currents flowing in the respective windings in the multi-phase windings become identical. The motor control unit 20 individually generates and outputs instructions to the first amplifier 4-1, second amplifier 4-2, third amplifier 4-3 and fourth amplifier 4-4 which supply driving electric power to the respective sets of three-phase windings of the motor 3, in such a manner that the currents flowing in the windings in the three-phase windings of the motor 3 become identical with respect to the identical phase. When the motor control unit 20 generates the instructions, the currents flowing in the respective windings of each set of three-phase windings are fed back to the motor control unit 20. The acquisition unit 11 acquires waveforms of currents flowing in windings of individual phases in each set of multi-phase windings, or waveforms of voltages occurring in the windings of the individual phases in each set of multi-phase windings, as electricity information corresponding to the respective windings in the three-phase windings of the motor 3 in which an identical voltage is applied to the sets of multi-phase windings by control based on an identical instruction. The motor control unit 20 generates an instruction corresponding to the winding of the phase in which a layer short occurs, such that the current flowing in the winding of the phase in which the layer short occurs becomes identical to the currents flowing in the normal windings of the identical phase of the other sets which are free from a layer short. Thus, the instruction corresponding to the winding of the phase in which the layer short occurs becomes sharply different from the instructions corresponding to the windings of the identical phase in the other sets. When such control is successfully executed by the motor control unit 20 as to make identical the current flowing in the winding of the phase in which the layer short occurs and the currents flowing in the normal windings of the identical phase of the other sets which are free from a layer short, the layer short can be detected based on the amplitude of the instruction in the fourth embodiment, as described with reference to FIG. 11. However, when such control fails to be executed by the motor control unit 20 as to make identical the current flowing in the winding of the phase in which the layer short occurs and the currents flowing in the normal windings of the identical phase of the other sets which are free from a layer short, it may be determined by any one of the first to third embodiments whether the layer short occurs in the winding of this phase, based on the waveforms of currents flowing in the windings in each set of three-phase windings, or the waveforms of voltages occurring in the respective windings in each set of three-phase windings, which are acquired by the acquisition unit 11.

The above-described short detection apparatus 10 can detect a layer short of a winding in the identical phase of the multi-phase windings of the multi-winding motor as illustrated by S1 in FIG. 5. The short detection apparatus 10 can also detect a layer short between different phases in the three-phase windings of the multi-winding motor as illustrated by S2 in FIG. 5. In one set (e.g. 30-1) of three-phase windings of the motor 3 in which an identical voltage is applied to the plural sets of three-phase windings by control based on an identical instruction, if a short between the U-phase winding U1 and W-phase winding W1 occurs at a position S2, for example, as illustrated in FIG. 5, the waveforms of current flowing in the U-phase winding U1 and current flowing in the W-phase winding W1, in which the layer short occurs in the three-phase windings of the set 30-1, become different from the waveforms of currents flowing in the normal windings of the U phase and W phase of the other sets in which no layer short occurs. Thus, a short can be detected by the layer short detection processes according to the above-described first to third embodiments. In addition, also in the motor 3 in which individual control is executed by instructions for respective sets such that currents flowing in windings in three-phase windings become identical, the instructions corresponding to the U-phase winding U1 and W-phase winding W1 in which the short occurs become greatly different from the instructions corresponding to the U-phase windings U1 and W-phase windings W1 in the other sets. Thus, a short can be detected by the layer short detection process of the fourth embodiment.

The above-described short detection apparatus 10 can be constituted in a software program form. For example, the functions of the short detection apparatus 10 can be realized by operating, according to the software program, the arithmetic processing device, such as a DSP or FPGA, in the motor control apparatus 1, or the arithmetic processing device, such as a DSP or FPGA, in the numerical control system 100. For example, in the motor control apparatus 1 and numerical control system 100, currents flowing the respective windings or voltages occurring in the respective windings are detected and used for the control of the motor 3. The short detection apparatus 10 uses, also for the layer short determination process, the waveforms of the currents or voltages of the windings or the instructions for controlling the motor 3, which are used for the control of the motor 3. Thus, unlike conventional art, the measurement by using a dedicated apparatus (hardware) is not needed. Moreover, the layer short determination process can be executed without depending on the operation state of the motor 3. Besides, the short detection apparatus 10 performs the layer short determination process, based on the waveforms of the currents or voltages of the windings, which are acquired during the control of the motor 3 by the motor control apparatus 1 or numerical control system 100, or the instructions for controlling the motor 3. It is thus possible to save, unlike conventional art, the time and labor for measuring in advance the current waveform of a normal motor which is free from a layer short.

According to one aspect of the present disclosure, a layer short of a winding in a motor can be detected in an arbitrary motor operation state, without using a dedicated apparatus.

The invention claimed is:

1. A short detection apparatus configured to detect a layer short in a motor in which a plurality of sets of multi-phase windings are independently disposed in a stator, the short detection apparatus comprising:
    an acquisition unit configured to acquire electricity information corresponding to windings of individual phases in each of the sets of the multi-phase windings; and
    a determination unit configured to determine, based on a comparison of the electricity information which the acquisition unit acquires with respect to windings of a mutually identical phase in each of the sets of the multi-phase windings, whether a layer short occurs in any one of the windings of the mutually identical phase.

2. The short detection apparatus according to claim 1, wherein the electricity information is waveforms of currents flowing in the windings of the individual phases or waveforms of voltages occurring in the windings of the individual phases.

3. The short detection apparatus according to claim 2, wherein the determination unit is configured to compare, between the sets, the waveforms acquired by the acquisition unit with respect to the windings of the mutually identical phase, and configured to determine, when a difference between an amplitude of the waveform in any one of the sets of the multi-phase windings and amplitudes of the waveforms in the other sets of the three-phase windings is greater than a preset amplitude threshold, that a layer short occurs in the identical phase of the one set of the multi-phase windings.

4. The short detection apparatus according to claim 2, wherein the determination unit is configured to compare, between the sets, the waveforms acquired by the acquisition unit with respect to the windings of the mutually identical phase, and configured to determine, when a difference between a phase of the waveform in any one of the sets of the multi-phase windings and phases of the waveforms in the other sets of the three-phase windings is greater than a preset phase threshold, that a layer short occurs in the identical phase of the one set of the multi-phase windings.

5. The short detection apparatus according to claim 2, wherein the determination unit is configured to compare, between the sets, rising times of the waveforms acquired by the acquisition unit with respect to the windings of the mutually identical phase at a time when the motor is accelerated from a stop state, and configured to determine, when a difference between the rising time of the waveform of any one of the sets and the rising times of the waveforms of the other sets is greater than a preset rising time threshold, that a layer short occurs in the identical phase of the one set of multi-phase windings.

6. The short detection apparatus according to claim 1, wherein an identical voltage is applied to the sets of the multi-phase windings by control based on an identical instruction.

7. The short detection apparatus according to claim 1, wherein the electricity information is, in the motor in which individual control is executed by instructions for the respective sets such that currents flowing in the windings of the individual phases in the multi-phase windings become identical, amplitudes of the instructions corresponding to the windings in the multi-phase windings.

8. The short detection apparatus according to claim 7, wherein the determination unit is configured to compare, between the sets, the amplitudes of the instructions acquired by the acquisition unit with respect to the windings of the mutually identical phase, and configured to determine, when a difference between the amplitude of the instruction in any one of the sets and the amplitudes of the instructions in the other sets is greater than a preset instruction threshold, that a layer short occurs in the identical phase of the one set of the multi-phase windings.

9. A motor control apparatus comprising:
a motor control unit configured to control the motor; and
the short detection apparatus according to claim 1.

10. A numerical control system of a machine tool, comprising:
the motor control apparatus according to claim 9.

* * * * *